L. G. VOGT & J. H. KUNDERT.
CORN PLANTER.
APPLICATION FILED MAR. 15, 1913.

1,095,754.

Patented May 5, 1914.

Witnesses

Inventors
Lewis G. Vogt &
Jacob H. Kundert
By Victor J. Evans
Attorney

UNITED STATES PATENT OFFICE.

LEWIS G. VOGT AND JACOB H. KUNDERT, OF DELPHOS, OHIO.

CORN-PLANTER.

1,095,754. Specification of Letters Patent. Patented May 5, 1914.

Application filed March 15, 1913. Serial No. 754,436.

*To all whom it may concern:*

Be it known that we, LEWIS G. VOGT and JACOB H. KUNDERT, citizens of the United States, residing at Delphos, in the county of Allen and State of Ohio, have invented new and useful Improvements in Corn-Planters, of which the following is a specification.

This invention relates to corn planters, and it has for its object to produce a simple and efficient device, whereby different numbers of seeds may be alternately deposited.

With this and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
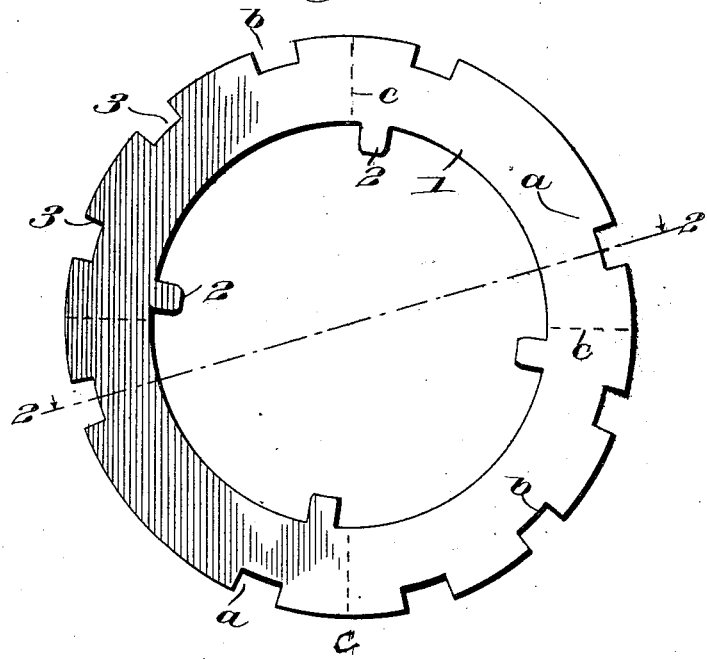
Figure 2:
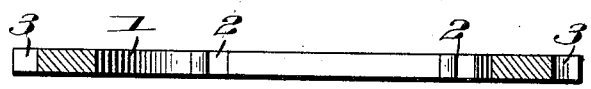

In the drawing, Figure 1 is a top plan view of the improved device. Fig. 2 is a sectional view taken on the line 2—2 in Fig. 1.

Corresponding parts in both figures of the drawing are denoted by like characters of reference.

A ring or annulus 1 is provided with inwardly extending lugs 2 constituting means whereby it may be connected with a rotary element constituting a part of the seed dropping mechanism of a corn planter. Any suitable means may be utilized for imparting an intermittent rotary motion to the device. The annulus is provided along its outer circumference with recesses 3 which, when the device is in position for operation in the hopper of an ordinary corn planter, will coöperate with the walls of said hopper to constitute seed cups. These seed cups are disposed in groups, some of which, *a*, contain two seed cups, while other groups, *b*, contain three seed cups, each of suitable shape and dimensions to receive a single seed or kernel. The groups *a* and *b* are disposed in alternate order throughout the circumference of the annulus, each group occupying an equal portion of the circumference. For the purpose of enabling the construction to be more clearly understood there has been shown in Fig. 1 dotted lines *c* between the groups *a* and *b* and four such groups, two of each, have been shown, each occupying 90 degrees of the circumference of the annulus. When a greater number of groups is used the proportions will be changed, as will be readily understood; thus for instance, if six groups are used each would occupy but 60 degrees of the circumference.

It will be very clear to anyone familiar with this art that when the improved device is positioned for operation in the hopper of a corn planter, the rotary member with which it is connected must be intermittently rotated in such a fashion that at each step the annulus will be rotated about its axis to the extent of one of the groups *a* or *b*, the contents of the seed cups of which will thus be dropped or deposited. In this manner it is evident that at successive operations different numbers of seeds will be dropped, that is to say, alternately two and three seeds. By varying the number of notches constituting the seed cups, the number of seeds deposited may be varied; thus, for instance, the device may be easily constructed so as to deposit three and four seeds alternately.

It frequently happens that land that is able to support more than two plants to each hill will not be sufficiently rich to nourish three plants to each row. When this is the condition of the soil, the value of this invention becomes readily apparent, because by the use thereof the hills will receive two and three seeds alternately, or an average of two and half seeds to each hill. By varying the number deposited in each hill, the best and most advantageous results may be obtained.

Having thus described the invention, what is claimed as new, is:—

1. A device for the purpose set forth consisting of an annulus having inwardly extending lugs and provided at the circumference thereof with recesses arranged in groups, each of which occupies an equal extent of the circumference, adjacent groups having different numbers of recesses, every other group having each one recess in excess of the intermediate groups.

2. A device for the purpose set forth consisting of an annulus, means associated therewith whereby said annulus may be connected with a rotary element for rotation therewith, and said annulus being provided at the circumference thereof with groups of recesses constituting seed cups, each of said groups occupying an equal extent of the circumference, adjacent groups having different numbers of recesses, every other group having each one recess in excess of the intermediate groups.

In testimony whereof we affix our signatures in presence of two witnesses.

LEWIS G. VOGT.
JACOB H. KUNDERT.

Witnesses:
ARTHUR F. MILLER,
CHRIS KUNDERT.

Copies of this patent may be obtained for five cents each, by addressing the "Commissioner of Patents, Washington, D. C."